Patented Mar. 8, 1949

2,463,753

UNITED STATES PATENT OFFICE 2,463,753

PROCESS OF PREPARING SELENIUM FOR THE PURPOSE OF INCREASING ITS CONDUCTIVITY

Adrianus Jacobus Dekker, Eindhoven, Netherlands, assignor to Hartford National Bank and Trust Company, Hartford, Conn., as trustee No Drawing. Application November 27, 1946, Serial No. 712,724. In the Netherlands October 1, 1945

Section 1, Public Law 690, August 8, 1946
Patent expires October 1, 1965

5 Claims. (Cl. 175—366)

It is known to add small amounts of substances to selenium intended, for example, for the manufacture of light-sensitive resistances, photoelectric cells, rectifying cells, the addition being effected for the purpose of increasing the conductivity.

Numerous of these admixtures are hygroscopic or decompose when exposed to air as for example certain volatile halides which when added to selenium increase the conductivity of the selenium. Now, it has been found that this change may result in the admixture being rendered less serviceable.

The present invention has for its purpose to meet this drawback. According to the invention, this is possible by utilising an admixture which is hygroscopic or decomposes in the air, into the form of a nonhygroscopic complex compound not decomposing in air, from which the admixture is obtained upon heating at high temperature. The term "complex compound" is to be understood to mean a compound built up by combination of the admixture with another material.

The invention is of particular importance for halides which increase the conductivity and which change into oxide upon treatment with water or an alkali. These halides hydrolyse in many cases in air, so that without the use of the invention harmful oxide, water, hydrochloric acid would get into the selenium together with the halide. Complexes which are durable in air may be readily obtained by combination with other halides, such as alkaline halides or ammonium halide.

The complex compound may be mixed as such with the selenium by stirring it with the molten selenium, during which operation it will usually decompose into its components as a result of the high temperature. Consequently, in addition to the admixture which is actually active, the other component also gets into the selenium. For example, with the use of $[NH_4]_2SnBr_6$ the selenium contains not only $SnBr_4$ but also $NH_4Br$. However, $NH_4Br$ dissolves in selenium and surprisingly adds in itself to the conductivity, so that this does not constitute a drawback.

It is also possible to heat the complex compound and to conduct the vapour produced into the molten selenium with the aid of a gas current led over the complex compound. In this case the complex compound is split up again into its components.

This embodiment of the invention makes it possible that with the use of a complex compound in practice the admixture only gets into the selenium. For this purpose it is sufficient if the component combined with the admixture has a volatility so much smaller than that of the admixture itself that the latter only vaporises and is taken along by the gas current, whereas the other component remains behind. This is the case, for example, with $K_2TiCl_6$. This embodiment is particularly suitable when using a large proportion of the above-mentioned halides, since many of them are comparatively volatile.

It is also possible to introduce the admixture into selenium by distillation of a mixture of selenium and a complex according to the invention, if the complex, or at least the active component obtained from the complex during heating, has approximately the same volatility as the selenium at the distillation temperature. As before, it can be ensured that in practice the admixture only gets into the selenium, if the other component has a sufficiently smaller volatility.

What I claim is:

1. A process for increasing the conductivity of selenium which comprises the steps of adding a non-hygroscopic complex halide containing an admixture of a halide which is hygroscopic and decomposes in air and which increases the conductivity of the selenium to the selenium, and heating the complex halide in the presence of the selenium to decompose the complex halide to obtain the admixture component for increasing the conductivity of the selenium.

2. A process for increasing the conductivity of selenium, which comprises the steps of forming an non-hygroscopic complex halide by combining a hygroscopic halide which decomposes in air and which increases the conductivity of selenium and an alkaline halide, adding the complex halide to the selenium, and heating the complex halide in the selenium to decompose the complex halide to obtain the conductive halide component for increasing the conductivity of the selenium.

3. A process for increasing the conductivity of selenium, which comprises the steps of volatilizing a non-hygroscopic complex halide which contains an admixture of a halide which is hygroscopic and decomposes in air, and adding said admixed halide during volatilization of said complex halide to said selenium to increase the conductivity thereof.

4. A process for increasing the conductivity of selenium which comprises the steps of adding $(NH_4)_2SnBr_6$ to molten selenium, and decomposing the bromide to increase the conductivity of the selenium.

5. A process for increasing the conductivity of selenium which comprises the steps of volatilizing $K_2TiCl_6$ in the presence of selenium, and decomposing the chloride to increase the conductivity of the selenium.

ADRIANUS JACOBUS DEKKER.

REFERENCES CITED

The following references are of record in the file of this patent:

FOREIGN PATENTS

| Number | Country | Date |
|---|---|---|
| 472,961 | Great Britain | Sept. 20, 1937 |